Aug. 8, 1967 G. H. TODT 3,334,843
CLOSURE OF CARRIER FOR PNEUMATIC-TUBE SYSTEMS
Filed Oct. 22, 1965
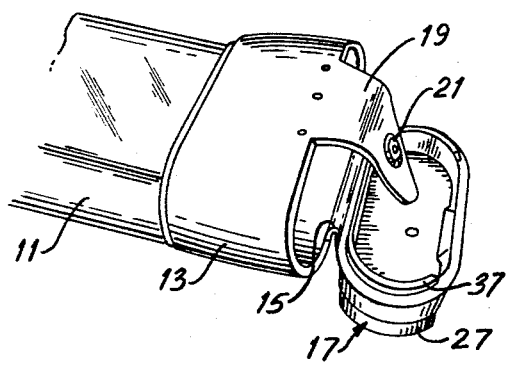
FIG. 1
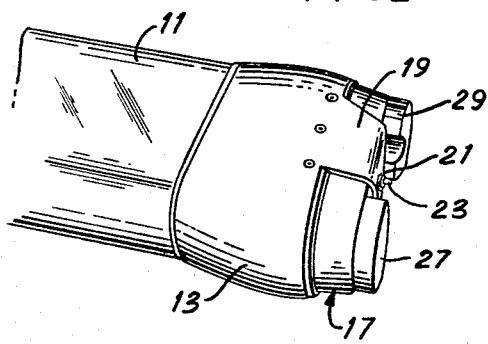
FIG. 2
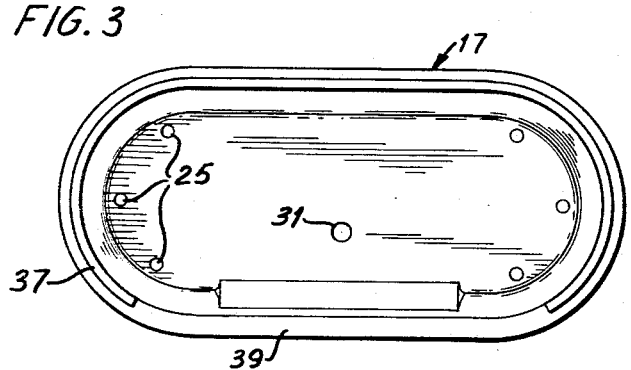
FIG. 3
FIG. 4
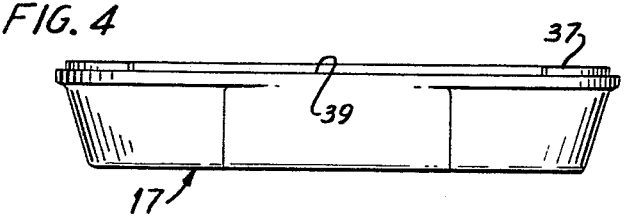
FIG. 5
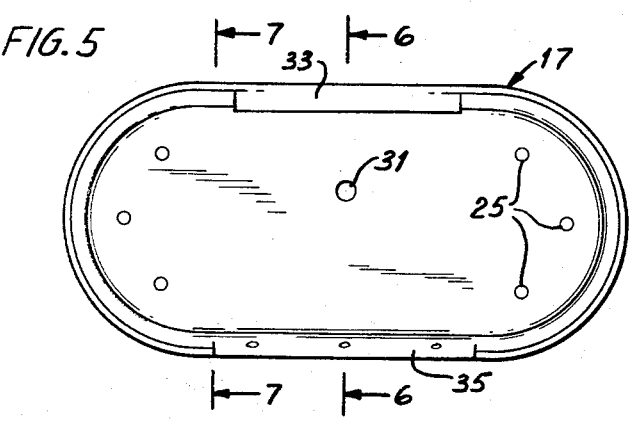
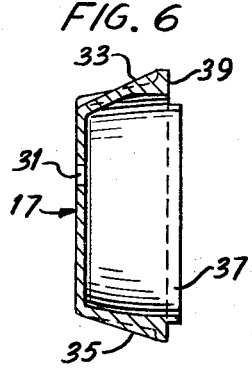
FIG. 6
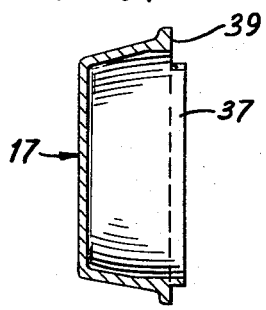
FIG. 7
INVENTOR.
GERHARD H. TODT
BY
HIS ATTORNEY

United States Patent Office 3,334,843
Patented Aug. 8, 1967

3,334,843
CLOSURE OF CARRIER FOR PNEUMATIC-TUBE SYSTEMS
Gehard H. Todt, Ringwood, N.J., assignor to International Telephone and Telegraph Corporation
Filed Oct. 22, 1965, Ser. No. 501,850
1 Claim. (Cl. 243—35)

ABSTRACT OF THE DISCLOSURE

A cover is provided for closing an end of the hollow body of a pneumatic-tube carrier. This cover furnishes additional interior space within the carrier without causing the carrier to be impeded in its passage through the pneumatic-tube system.

---

This invention relates to a closure for dispatch carriers such as are employed in pneumatic-tube systems. In particular, this invention relates to such carriers which are capable of accommodating loads of maximum length without causing the carrier to be impeded in its passage through the bends of the tubing in the pneumatic-tube system.

In pneumatic-tube systems which are commonly in use at the present time, a popular cross-sectional configuration of tubing is oval, with rounded portions which comprise parts of right cylindrical surfaces connected by straight portions of the tubing wall. Thus, the cross-section of the tubing has a long axis between the cylindrical portions thereof and a short axis between the straight portions thereof. A popular size of tubing for use in this kind of system has a long cross-sectional axis of seven inches and a short cross-sectional axis of four inches. The carrier which is to be transported through tubing of this nature has a similar cross section, but with dimensions which are enough smaller so that the carrier can pass through the tubing.

When it is necessary to change the direction of propagation of a carrier in a pneumatic-tube system, the tubing must be bent sufficiently to permit the change of direction but not so sharply that the motion of the carrier therethrough will be impeded by the bend. For instance, in pneumatic-tube systems having the 4" x 7" dimensions as referred to above, it is common to use tubing bends having a radius of four feet. Bends of this radius will accommodate carriers of prior-art nature which have a useful internal length of up to fourteen inches. When prior-art carriers are used, it has not been possible to obtain a carrier with useful internal length greater than fourteen inches without having the carrier impeded in its passage through a tube bend having a radius of four feet.

It has recently become necessary to provide carriers for pneumatic-tube systems in which the internal dimensions of the carriers are sufficiently great to accommodate two stacks of punched data-processing cards in end-to-end juxtaposition. The dimensions of the punched cards which are commonly used in data-processing operations are such that the total length of two stacks of such cards in end-to-end relationship is greater than fourteen inches and may approach fifteen inches. Similarly, the commonly used dimensions of certain other documents which must be transported through pneumatic-tube systems make it necessary to have useable internal dimensions of greater than fourteen inches inside the carriers. Typical of these other kinds of documents which must be transported are rolls of X-ray films such as must be transported through the pneumatic-tube systems as employed in hospitals.

If pneumatic-tube carriers of prior-art types were lengthened to provide internal dimensions which are sufficiently great for the above-described purposes, the external dimensions of the carrier would thereby be rendered so great that the carrier would be fouled or impeded in pasage through a tube bend having a radius of four feet. In order to transport the required quantities of such cards and documents by lengthening the carriers of conventional types, it would be necessary to modify existing pneumatic-tube systems by the installation of tubing bends having a radius of at least five feet. Such modification of existing systems would be prohibitively expensive in view of the fact that the systems are built into existing walls, and sufficient space is not always provided for increasing the radius of a tubing bend without thereby making it necessary for the tubing to cut through the useable space of the rooms in the building rather than being accommodated within the wall space thereof. This would obviously be extremely inconvenient and uneconomical.

In view of the widespread adoption of the use of data-processing machines in buildings having existing pneumatic-tube dispatch systems, and in view of the great inconvenience which would be involved in modifying the system itself in order to permit the carrying of the required numbers of punched cards in carriers constructed according to prior art, it has become necessary radically to change the nature of the carriers themselves in order to permit the desired functions to be accomplished without drastic modification of the entire pneumatic tube systems.

Accordingly, it is an object of this invention to provide carriers for pneumatic-tube systems which will be capable of accommodating two stacks of punched cards in end-to-end relationship and which will still be capable of passing through existing pneumatic-tube systems having a radius of four feet in the tubing bends.

It is a further object of this invention to provide a closure for such carriers which furnishes additional interior space within the carrier and which does not lead to fouling of the carrier within the tube.

It is another object of this invention to provide a carrier closure which is easy and inexpensive to fabricate and which is capable of retaining the carrier in a securely closed condition.

Briefly, these and other objects of my invention have been fulfilled by providing a closure cover which can be attached to a standard carrier and which has a hollowed-out cross section such as to provide an additional interior space beyond the end of the body of the carrier itself. The external configuration of the cover according to my invention is so tapered that it does not interfere with passage of the carrier through the bends in the tubing in the system. Provision is still made for the accommodation of necessary resilient bumpers at the end of the cover in order to prevent damage to the carrier and to its contents when it suddenly comes to a stop at the end of the tubing of the system.

For a full undersanding of my invention, reference should be made to the following detailed specification taken in conjunction with the accompanying drawings, in which:

FIGURE 1 is a perspective view of a portion of a carrier showing the closure cover, according to the invention, attached to the end of the carrier but in open position for insertion of material into the carrier;

FIGURE 2 is a perspective view of the same carrier with the closure cover in closed position and fastened in place;

FIGURE 3 is a view of a blank for the closure cover showing the inside of the cover before assembly;

FIGURE 4 is a front view of the blank from which the closure cover is made;

FIGURE 5 is a view of the outside of the closure-cover blank before attachment to the carrier;

FIGURE 6 is a cross-sectional view of the blank shown in FIGURE 5, taken along the plane marked by the arrows 6—6 as indicated in FIGURE 5; and FIGURE 7 is a cross-sectional view of the blank of the closure cover taken along the plane marked by the arrows 7—7 as indicated in FIGURE 5.

Turning now to FIGURE 1 of the drawings, we find illustrated a portion of a carrier having a body 11, which may be made of transparent material or any other suitable material. At the end of this body is fastened a rubbing band 13, which may be fabricated from leather or other durable material and fastened around the end of body 11. Rubbing band 13 might alternative be called a "skirt" in the terminology which is sometimes used in the pneumatic-tube art.

Rubbing band 13 may have formed integrally therewith a portion which forms a hinge 15, one end of which may be attached to the outside of the closure cover 17 in order to connect it to the body of the carrier.

The rubbing band 13 may also have formed integrally therewith a fastener strap 19 which has incorporated into it a catch 21, which may be in the form of a snap fastener. When closure cover 17 is rotated from its open position shown in FIGURE 1 to its closed position shown in FIGURE 2, the closure cover may be retained in place by bending fastener strap 19 around the closure cover and by snapping catch 21 over a fastening post 23 which is attached rigidly to the outside surface of closure cover 17. Such engagement between catch 21 on the fastener strap 19 and fastening post 23 on the outside surface of closure cover 17 retains the closure cover in its closed position and prevents any material within the carrier from falling out.

Turning now to FIGURE 3 of the drawings, which shows an inside view of the closure-cover blank, it will be noted that six holes 25 in the material of the cover are shown. These holes 25 may be formed in the material of the closure-cover blank, which, for instance, may be an aluminum casting. Any other suitable strong and lightweight material might be employed for this purpose. In the holes 25 of the closure cover may be secured rivets for retaining in place the end bumpers 27 and 29, respectively, as shown in FIGURE 2 of the drawings. End bumpers 27 and 29 may be fabricated from felt or other resilient material such as rubber, and serve to protect the carrier from damage upon impact with the ends of the pneumatic-tube system. It is to be noted that end bumpers 27 and 29 are reduced in size so that their cross section is much less than the cross section of the carrier body. This is of great assistance in preventing binding of the end of the carrier within a bend of the tube system. It is also to be noted that the outer profile of the closure cover 17 is approximately conical in that its outer dimension reduces as one progresses in a direction from the carrier body toward the end bumpers. This also is of great assistance in preventing the carrier from binding within the bends of the pneumatic-tube system.

Returning to FIGURE 3 of the drawings, it will be noted that a hole 31 is provided in the blank for the closure cover. This hole furnishes a mounting point for fastening post 23. If fastening post 23 is inserted directly into hole 31, the end if the post toward the interior of the carrier may be countersunk in such a way that the post does not project into the carrier and waste useful space by reducing the effective internal length of the carrier. Similarly, the rivets or other fasteners which are used in the holes 25 to retain the end bumpers in place may also be countersunk to avoid the wasting of useful internal space within the closure cover 17. It is to be noted, from reference to the perspective view of FIGURE 1, that this countersinking of fasteners renders the inner surface of the closure cover quite smooth and unobstructed.

Turning now to FIGURE 4 of the drawings, it will be observed that closure cover 17 is formed from a hollowed out body having a wall which is only sufficiently thick to provide the necessary strength. Thereby, the effective internal length of the carrier is maximized while minimizing the external length. FIGURE 4 also shows the way in which the external cross section of closure cover 17 is tapered in order to prevent binding within the tubing bends. FIGURE 4 also shows a bevel 33 provided in the front face of the blank from which closure cover 17 is assembled. This bevel 33 accommodates fastener strap 19 when it is wrapped around the outer surface of closure cover 17, thereby preventing fastener strap 19 from adding appreciably to the outer cross section of the closure cover.

Reference to FIGURE 4 of the drawings shows not only the bevel 33 on the front outer surface of the closure cover, but also a land 35, formed on the rear external surface of the blank for the closure cover. Land 35 may have formed therein holes to receive rivets or other fasteners by which closure cover 17 is secured to hinge 15 of rubbing band 13.

Reference to FIGURE 6 shows a cross-sectional view taken along a central plane through closure cover 17 and showing plainly the bevel 33 and land 35 to which reference has just been made. It will be understood that bevel 33 and land 35 may be formed in the casting process or other process by which the blank for closure cover 17 is formed.

FIGURE 7 shows a cross-sectional view taken at a plane passed through the closure cover at a point nearer the end thereof and beyond the extremities of bevel 33 and land 35. Thus, the bevel and the land do not appear therein. A flange 37 may be formed around an outer portion of the edge of closure cover 17, and fits within the interior of rubbing band 13 of the carrier when the closure cover is in closed position on the carrier. Thus, flange 37 serves to maintain the closure cover in alignment with the body 11 of the carrier. Reference to FIGURE 3 shows that, in a preferred embodiment of the invention, flange 37 does not extend all the way around the periphery of the closure cover. Rather, the flange does not appear along the edge 39 of closure cover 17. The absence of flange 37 along edge 39 of the closure cover makes it possible more easily to seat the cover in closed position against the rubbing band 13 of the carrier.

It is to be noted that a closure cover according to the invention may be attached to a conventional pneumatic-tube carrier with only minor modification thereof. It is only necessary to have a suitable "skirt" or rubbing band at the end of the carrier in order to secure this type of closure cover thereto.

If a closure cover formed of electrically conductive material such as aluminum is to be employed in a pneumatic-tube system wherein electrical sensing is employed for the direction of the carriers into desired outgoing tubes at a central exchange point, it may be desirable to coat the exterior surface of the closure with a nonconductive material in order that the closure cover will not be sensed at the pick-up point which determines the routing of the carrier. An appropriate nonconductive material for this purpose is polytetrafluoroethylene which, in addition to being electrically nonconductive, also serves as a permanent lubricant which aids the smooth passage of the closure cover through the interior of the pneumatic-tube system.

It will be appreciated that this invention has accomplished by an elegantly uncomplicated means an important step forward in the pneumatic-tube art, and has made it possible to satisfy newly imposed demands placed on existing pneumatic-tube systems without changing the configuration of the primary components of the permanently installed tube systems themselves. Accordingly, the economic importance of this invention is substantial. While a single configuration of the invention has been described in detail in the specification, it will be understood that a number of modifications may be made therein without departing from the principles of the invention. Accordingly, the scope of this invention is to be limited only by the terms of the appended claim.

What I claim as new and desire to secure by Letters Patent of the United States is:

A cover for closing an end of the hollow body of a pneumatic-tube carrier, said cover comprising:
- a recessed main portion for fastening over the end of said hollow body with said recess facing said hollow body, said recessed main portion having a tapered cross-section in which the external cross-section of said recessed main portion decreases in the direction away from the open face of said recess;
- a flange extending along a substantial part of the edge of said recessed main portion adjacent said recess and projecting outward from said edge;
- a bevel being provided in the outer surface of said main portion in order to accommodate means for fastening said cover over said end of said hollow body;
- an outwardly extending fastening post being located in the outer surface of said recessed main portion; and
- at least one resilient bumper attached to the outer surface of said recessed main portion.

References Cited
UNITED STATES PATENTS

| | | | |
|---|---|---|---|
| 2,796,190 | 6/1957 | Tupper | 220—31 |
| 3,054,576 | 9/1962 | Hennessy | 243—39 |
| 3,073,546 | 1/1963 | Woodland | 243—35 |
| 3,201,063 | 8/1965 | Tearne | 243—35 |
| 3,221,919 | 12/1965 | Gessner | 220—31 |
| 3,240,375 | 3/1966 | Burrows | 220—31 |

EVON C. BLUNK, *Primary Examiner.*

H. C. HORNSBY, *Assistant Examiner.*